July 14, 1964

W. M. BREAZEALE ETAL 3,140,980

NEUTRONIC REACTOR

Filed May 9, 1960

INVENTORS
Bernard A. Mong
William M. Breazeale
Milton C. Edlund
BY
ATTORNEY

July 14, 1964

W. M. BREAZEALE ETAL 3,140,980

NEUTRONIC REACTOR

Filed May 9, 1960

INVENTORS
Bernard A. Mong
William M. Breazeale
Milton C. Edlund

BY

ATTORNEY

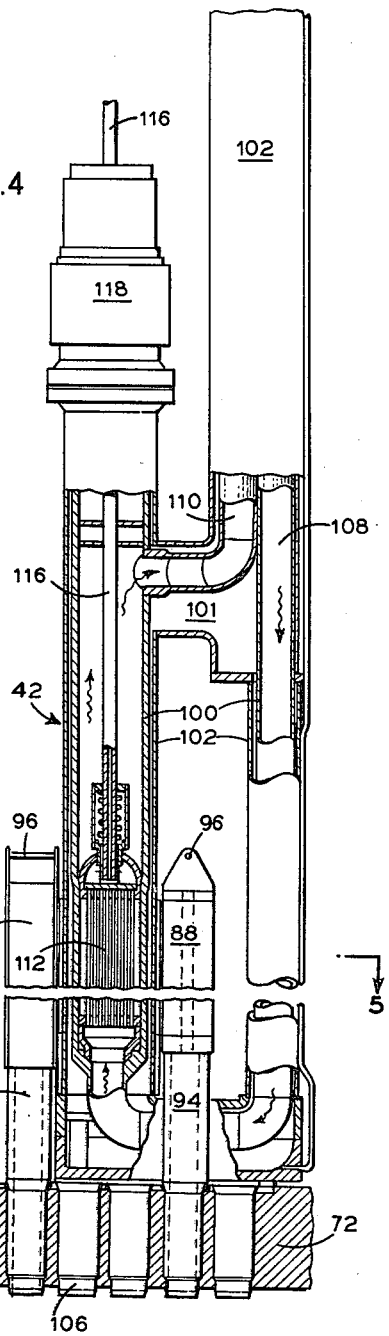
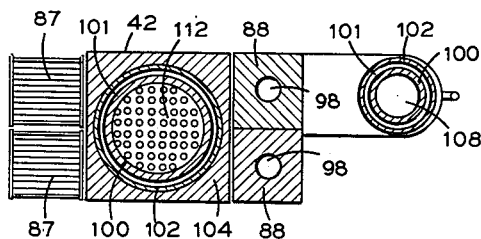
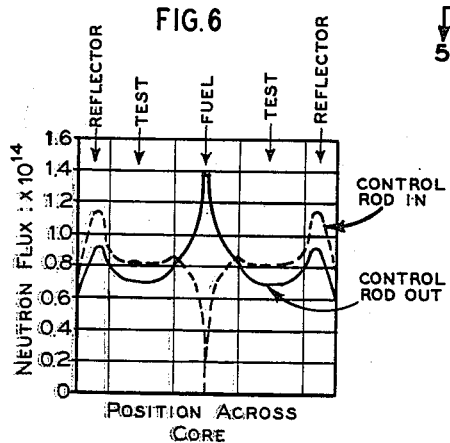

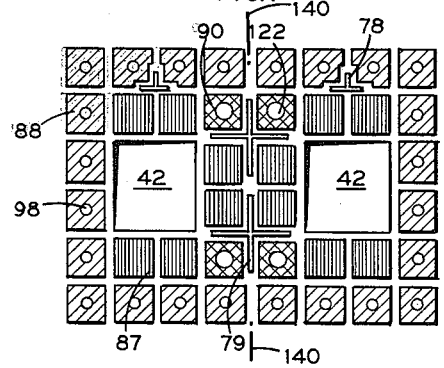
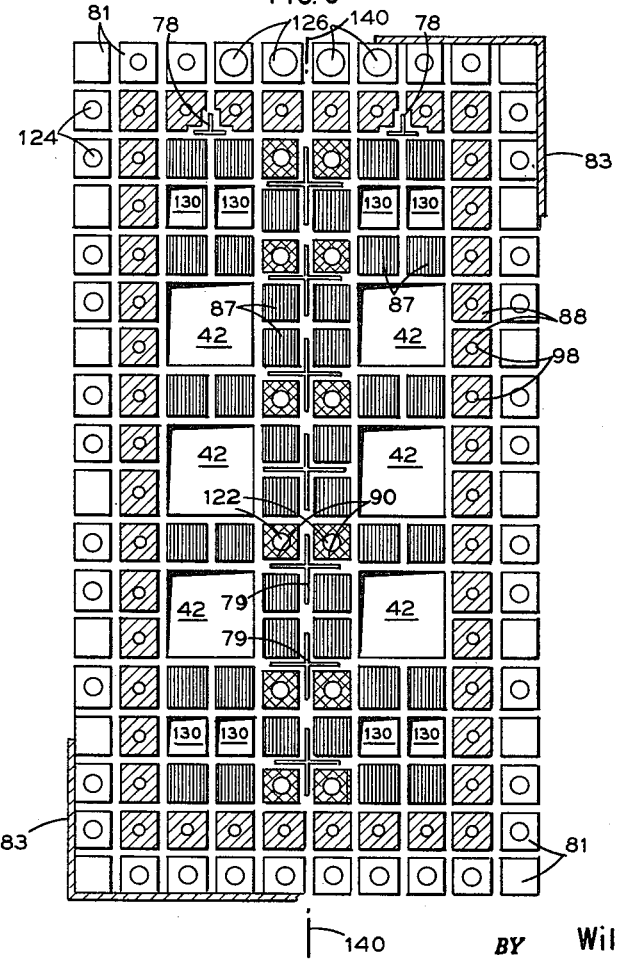

July 14, 1964 W. M. BREAZEALE ETAL 3,140,980
NEUTRONIC REACTOR
Filed May 9, 1960 5 Sheets-Sheet 5

INVENTOR.
Bernard A. Mong
BY William M. Breazeale
Milton C. Edlund
ATTORNEY

United States Patent Office 3,140,980
Patented July 14, 1964

3,140,980
NEUTRONIC REACTOR
William M. Breazeale and Milton C. Edlund, Lynchburg, and Bernard A. Mong, Campbell County, Va., assignors to The Babcock & Wilcox Company, New York, N.Y., a corporation of New Jersey
Filed May 9, 1960, Ser. No. 27,822
7 Claims. (Cl. 176—17)

This invention relates in general to a nuclear reactor wherein a controlled chain-type fission reaction takes place, and more particularly to a pressurized water reactor adapted to be operated for fuel test purposes.

In a nuclear reactor, a neutron fissionable isotope such as $U^{233}$, $U^{235}$, $Pu^{239}$, or mixtures thereof, is fissioned by absorption of thermal neutrons. A self-sustaining chain reaction may be established by the neutrons evolved from the fission if the mass of fissionable material is made sufficiently large and is arranged in a suitable configuration. Specific details of the theory and essential characteristics of such reactors are set forth in Patent No. 2,708,656, issued to Enrico Fermi et al. on May 17, 1955.

A nuclear test reactor differs from other types of reactors in that its primary purpose is to provide neutrons for use in experimental regions within the reactor. Furthermore, space must be found within the reactor for carrying on the experiments without unnecessarily increasing the mass required to achieve criticality. In addition, this space must provide a maximum amount of radiation to carry out the desired experiments without influencing the radiation reaching other experiment locations or regions.

It has been found in previous test reactors that the neutron flux available in the experiment locations or test spaces varies with the length of time the fuel elements have been in operation within the reactor. Thus when the reactor is first operated with new fuel elements and has a relatively high percentage of fissionable material therein, the neutron flux in the test space is relatively low and, after an extended period of operation during which the fissionable material is burned out, the neutron flux in the test space is relatively high. Most test reactors are now operated at a constant power level, which limits the flux variation to that caused by fuel burnup and neutron poison material increase within the core. Such operation limits the variables capable of affecting the flux thus making it difficult to maintain a constant neutron flux in the test space. Some test reactors have been operated at variable power level to compensate for fuel burnup and poison material increase to achieve a constant neutron flux within the test spaces, however, results obtained from these reactors are questionable in that such a method of operation reduces the total number of neutrons available in the reactor for sustaining the chain reaction and for use in the testing space.

The present invention provides a reactor the core of which has the fuel elements, reflector elements, control rods, and test spaces optimally arranged to provide a substantially constant neutron flux in the test spaces throughout the life of the fuel elements. When the fuel elements are first placed into service, the control rods are almost fully inserted. As the fissionable material in the fuel elements burns out, the control rods are withdrawn from the core to maintain criticality within the reactor. The relative placement of the fuel elements, reflector elements, and test spaces is such that, as the control rods are moved into and out of the core, the neutron flux within the test space remains substantially constant. In this manner fuel elements may be used most economically while providing constant irradiation conditions in the test spaces throughout the core life.

Accordingly the present invention provides a nuclear reactor containing a supercritical mass of fissionable fuel distributed as a number of elongated verticaly disposed fuel assemblies of heterogeneous form, geometrically arranged in a core to undergo a controlled chain-type fission reaction. Excess neutrons generated by the reaction are made available to experimental regions provided in the reactor core.

The core of this reactor is characterized by the fact that in all of the variations of its arrangement, the major concentration of the fuel elements are arranged parallel to each other and contiguous to a common plane with a plurality of reflector elements disposed about the fuel elements to form at least one testing space between the fuel elements and the reflector elements. Control rods are positioned in this common plane. The test space is subdivided by a further number of fuel elements in a plane normal to the common plane. Also a number of interior moderator elements are positioned in the core, one at each intersection of the plane of the major concentration of the fuel elements with the normal plane of the subdividing fuel elements where the subdividing fuel elements are contiguous to the plane of the major concentration of the fuel elements.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of the invention.

Of the drawings:

FIG. 4 is a vertical section of a typical test loop assembly;

FIG. 5 is a section taken along line 5—5 of FIG. 4;

FIG. 6 is a graphical representation of the neutron flux as it appears along a typical section of the core as represented by line 6—6 of FIG. 3;

FIG. 7 is a plan view of an alternate minimum core arrangement;

FIG. 8 is a plan view of a second alternate core arrangement;

Figures 1, 3:
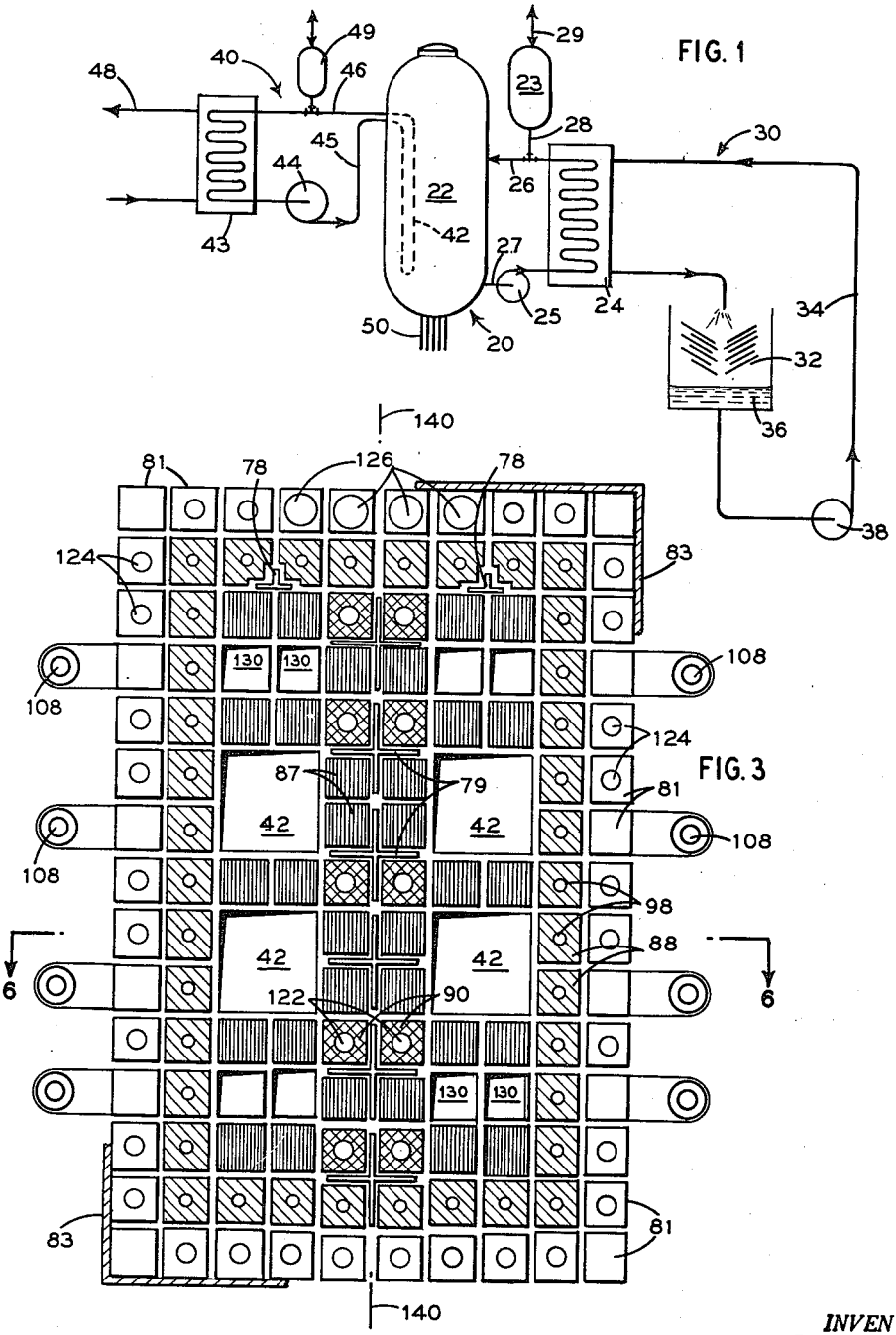
FIG. 1 is a schematic diagram showing the reactor of the invention within a heat transfer system.
FIG. 3 is an enlarged plan section of the reactor taken along line 3—3 of FIG. 2 showing the preferred core arrangement.

In FIG. 1 there is shown the nuclear reactor of the present invention located in a heat transfer system. The system comprises a pressurized water-type reactor 22, wherein heat is generated by a controlled chain-type fission reaction, a pressurizer 23, heat exchangers 24, and primary coolant pumps 25 all connected together into a primary coolant circuit 20 by interconnecting lines 26 and 27. Pressurized water in the primary circuit 20 enters the reactor 22 from the heat exchanger 24 via line 26 and flows therethrough in heat transfer relationship with and removing heat from the fuel elements and experiments contained therein. The heated water then leaves the reactor and flows through line 27 through the primary coolant pumps 25 to the heat exchanger 24 where the heat, received by it in passage through the reactor, is removed by indirect heat transfer to a secondary coolant fluid. The cooled primary coolant fluid then flows through line 26 to the reactor 22 to complete the primary cycle. The secondary coolant circuit 30 is indirectly connected to the primary coolant circuit 20 through the heat exchanger 24 and consists of a cooling tower 32, a storage basin 36, and a secondary coolant pump 38, interconnected by lines 34. The secondary fluid then disposes of the heat in the cooling tower 32.

Pressure on the reactor system is maintained by a high pressure nitrogen gas supply (not shown) through line 29 into the pressurizer 23 which transmits pressure to the primary coolant system through line 28.

A separate cooling system 40 is provided for each test loop to provide facilities for varying test conditions and to dissipate heat generated during the reactor tests. FIGURE 1 schematically shows a heat transfer loop comprising a test loop 42, a heat exchanger 43 and a coolant pump 44 interconnected by lines 45 and 46 for one such test. The test loop 42 within the reactor 22 is provided with a source of coolant fluid from a heat exchanger 43 via pump 44 through line 45. After the coolant fluid has passed through the test loop 42 it is returned through line 46 to the heat exchanger to complete the cycle. The heat exchanger 43 is cooled by a supply of secondary cooling fluid through the line 48. A pressurizer 49, similar in function to pressurizer 23 of the main reactor system, is connected to the test loop circuit in line 46 to control the pressure within the test loop.

To operate the reactor for an extended period, it is necessary to provide a mass of fissionable material in excess of that required to sustain a fission chain reaction in a cold clean core. The excess mass of fissionable material is required to provide reactivity for temperature rise, build-up of neutron absorbing fission products, burn-up of fuel, and other miscellaneous reaction poisoning effects. To control this excess reactivity present within the reactor core, a control system is required.

Figure 2:
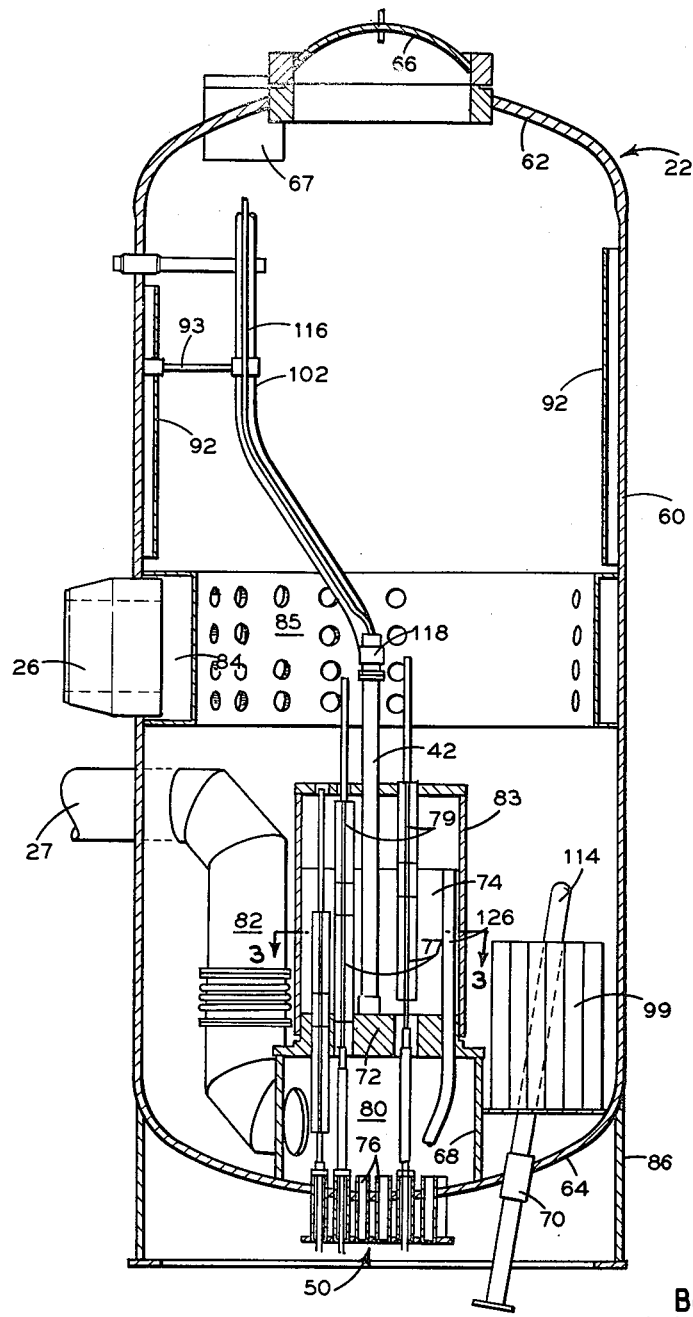
FIG. 2 is a vertical section through the reactor of the invention.
Figure 9:
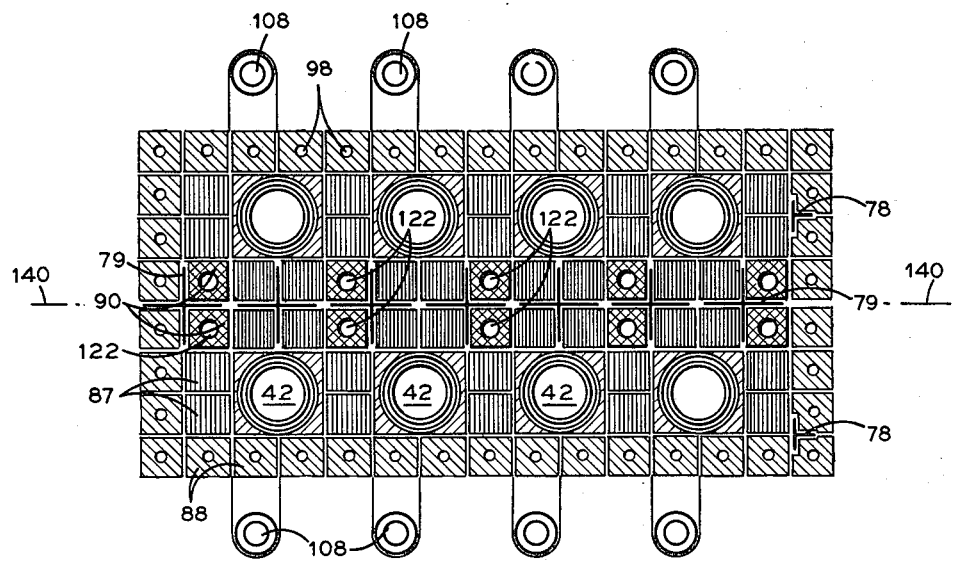
FIG. 9 is a plan view of another alternate core arrangement.

The neutronic controls 50 for the reactor in the present invention are bottom mounted and are disposed within the reactor so that they may be adjustably positioned within the core. Any of the well known electrical, mechanical, hydraulic or combination systems of control rod drive mechanisms may be used to position the controls. The controls are preferably fabricated of a material which will absorb neutrons without reproducing them and thus may be selected from the group of metals including cadmium, hafnium, boron, stainless steel, or an alloy of cadmium-indium and silver. The neutronic controls comprise control rods 78 and 79 which are connected to the control rod drives by follower rods 77 formed of a low neutron absorbing material such as zirconium or aluminum (see FIGS. 2 and 3). The use of a follower rod prevents the formation of a large void in the reactor core when the control rod is withdrawn while the use of a low neutron absorbing material prevents undue loss of neutrons.

In FIGS. 2 to 5, there is shown a preferred embodiment of the nuclear reactor 22. The nuclear reactor 22 comprises a vertically elongated pressure vessel 60 of circular cross section and having dished heads 62 and 64 enclosing the upper and lower ends of the vessel, respectively. The upper head 62 is provided with a removable closure 66 which allows complete access to the interior of the reactor. Ports 67 in the upper head 62 permits the installation of the test loops 42 in the reactor while openings 70 are provided in the lower head to permit limited access to the interior of the reactor for the installation of instrumentation 114 adjacent the core 74.

A cylinder 68 in the interior of and concentric with the pressure vessel 60 is positioned on the lower head 64 and is closed at its upper extremity by a plate 72 which serves as the grid plate for the reactor core 74. The lower head 64 is penetrated by a plurality of control rod shrouds 76 which extend into the cylinder 68 and provide protection for the control rods 78 and 79. These control rods are movably positioned in the reactor core and will be more thoroughly described hereinbelow. The cylinder 68, the lower head 64, and the grid plate 72 form the lower, or outlet, plenum chamber 80 of the reactor. A plenum outlet 82 leads from the lower plenum chamber 80 to the exterior of the reactor, connecting to the outlet line 27. This plenum outlet 82 is so arranged, as shown, so as to prevent the loss of the reactor coolant fluid covering the core 74 in the event of a leak in the primary coolant system. An inlet plenum chamber 84 served by pipe 26 is provided by an annular perforated plate 85 around the interior of the pressure vessel to aid in the distribution of inlet coolant fluid uniformly throughout the reactor. The coolant flow is directed down through the fuel elements into the outlet plenum chamber 80. This coolant flow also keeps the elements seated in the grid plate 72. The entire reactor is supported by a skirt 86 which joins the pressure vessel 60 near the juncture thereof with the lower head 64.

The reactor core 74, a plan view of which is seen in FIG. 3, is composed of fuel elements 87, reflector elements 88, interior moderator elements 90, the test spaces or loops 42, and the control rods 78 and 79 and is completely surrounded by a plurality of aluminum blocks 81 and a core shroud 83. The grid plate 72 is pre-assembled with the lower plenum chamber 68 and provides positioning for the reactor internals. The aluminum blocks 81 are essentially the same size as the fuel elements 87, and with the core shroud 83 define the outer periphery of the core.

A plurality of vertical T-shaped bars 92 (see FIG. 2) are radially attached to the inner surface of the pressure vessel 60 at a position above the core 74. The bars 92 provide a means for connecting a brace 93 between the reactor vessel wall and the upper extending core elements. Thus these elements are secured against lateral forces induced by the fluid during reactor operation. A plurality of vertical cylinders 99 are positioned adjacent the outlet plenum chamber 80 in the reactor and serve as storage racks for fuel elements. Thus fuel elements may be stored within the reactor vessel so that replacements may be made without completely removing the reactor from service.

The core arrangement (FIG. 3) is characterized by the fact that the control rods 79 are disposed in a common plane 140 in a spaced longitudinally parallel relationship. The major concentration of the fuel elements 87 lie in a plane parallel to that containing the control rods 79 and are contiguous thereto. Further, there is a plurality of reflector elements 88 disposed about, and in parallel spaced relationship with, the fuel elements which cooperate to form the test spaces 42 therebetween. Each test space is adjacent fuel elements at a position opposite the control rods. The grid plate 72 has a plurality of holes therethrough into which each core element is positioned. Thus, if the arrangement shown in FIG. 8 is the largest possible within a certain reactor, there would be one hole through the grid plate for each fuel 87, moderator 90, reflector 88, and aluminum element 81, one for each small test space 130, and four for each large test space 42. If a smaller core arrangement were to be used, such as in FIG. 7, then the additional holes in the grid plate, not used for positioning and holding core elements, would be plugged to prevent the cooling fluid from bypassing the core. In this way the core elements may be arranged with relative ease without major changes in the reactor structure. Initially a large test space 132 may be formed (see FIG. 10) which may then be subdivided into the smaller test spaces 42 or 130 (see FIGS. 3 and 8) by the use of additional fuel elements arranged in a plane normal to the control rod plane 140. An interior moderator element 90 is positioned one at each intersection of the plane of the major concentration of fuel elements with the fuel element plane normal to the control rod plane where these additional fuel elements lie contiguous to the plane of the major concentration of the fuel elements.

The heterogeneous fuel elements 87 are elongated, longitudinally contiguous assemblies and are geometrically arranged as a core to undergo a controlled chain-type fission reaction. The fuel element, of square cross-section, comprises longitudinally elongated exterior walls arranged to form an open-ended flow chamber therewithin and is of a type well known in the art. As an example, the walls forming the flow chamber are composed of a material capable of withstanding the high temperature generated by the chain-type fission reaction within the reactor core and have a low absorption cross-section for thermal neutrons. A plurality of rectangular fuel plates are arranged within and parallel to the longitudinal axis of the flow chamber walls. These fuel plates, of a uranium alloy, are attached to the side walls of the flow chamber and spaced so as to permit the flow of coolant around the plates and are clad with a protective coating such as aluminum or zirconium. Each fuel element (see FIG. 4) is provided with a transition piece 94 on the bottom to fit the grid plate 72 and position the element. A fuel handling adapter 96 is also provided on the top of the element assembly. The transition piece 94 forms a support for the fuel element and is adapted to fit into a circular hole in the grid plate. The transition piece serves the further function of changing the flow channel from a square to a circular cross-section and may be equipped with a variable orifice (not shown) to vary the flow through individual fuel elements and thus provide a balanced coolant flow through individual fuel elements and throughout the core.

Reflector elements 88 and interior moderator elements 90 are of the same approximate dimensions as the fuel elements for interchangeability and are fitted with a similar transition piece 94 for insertion into the grid plate 72. External cooling is accomplished by a proper spacing of these elements and coolant passages 98 and 122 through the elements 88 and 90 provide internal cooling. Test locations are also provided in the interior moderator elements 90 and will be described herein below.

The test loops 42 are part of the reactor and have a cross-sectional size approximately equal to four fuel elements but may be any whole multiple of the cross-sectional size of a fuel element. In FIG. 4 there is shown a vertical section of a typical test loop 42. The loop is a double walled tube of cylindrical cross-section and is formed into a U-shape with the inner wall 100 separated from the outer wall 102 by a gas space 101. The loop is enclosed within a square section of a low thermal neutron absorption cross-section material 104 such as beryllium (see FIG. 5). Each test loop is installed as a preassembled unit and is located in the reactor core by a positioning lug 106 which fits into the grid plate 72. The test loop comprises an inlet line 108, and outlet line 110, and a test section 112. The fuel samples to be tested are positioned in the test section 112 and are subjected to radiation from the fuel elements 87 and the reflector elements 88. The fuel sample is cooled by its own circulation system with the cooling fluid entering via inlet line 108 passing through the fuel sample and leaving via outlet line 110. The inlet and outlet lines are so arranged that they may be enclosed by a common outer wall 102. Thus enclosed, the inlet and outlet lines enter the reactor through ports 67 in the upper head 62 of the reactor 22.

The fuel sample may be provided with monitoring and test instruments which have leads 116 that extend out through a top plug 118 located above the test section and thence out through the ports 67 to appropriate recording centers (not shown). Ordinarily the test loop is assembled with the test fuel in place before insertion into the reactor. The loop design, however, permits loading and removal of the test specimen or specimens with the loop in place. The specimens are assembled into an integral unit to facilitate handling and to insure proper spacing for flow distribution. Test specimens are installed into an existing loop while the reactor is shut down by removing the top closure 66 of the reactor 10 and the top plug 118 of the test loop. The test specimen is then inserted into the test space 112 and the instrument leads 116 are extended through the top plug 118 and up through the port 67. The top plug is then connected to the test assembly and the loop is ready for operation.

Should it be necessary to replace a test loop 42, the reactor would first be shut down and the top closure 66 opened. The inlet-outlet lines would then be cut in the vicinity of the port 67 and the loop hoisted out through the top of the reactor and into a transfer cask or removed through a transfer chute in the lower portion of the reactor (not shown). Removal and replacement of irradiated samples is accomplished in a similar manner.

Small sample irradiation may be done in the capsule spaces 122 provided in the interior moderator elements 90 near the core centerline 140 at a high unperturbed neutron flux. Also, capsule holes 124 in the aluminum blocks 81 (FIGS. 3 and 8) with an intermediate unperturbed neutron flux are spaced along the periphery of the reflector.

Further irradiation space is provided by four hydraulic shuttle or "rabbit" tubes 126 (FIG. 3) which use water as the pressure fluid and as the test sample coolant. These tubes carry test samples from an accessible area outside of the reactor shielding through the lower portion of the reactor vessel to positions immediately adjacent to the reflector elements 88 in the core. This permits rapid, short term exposure to a relatively high neutron flux.

While the control rods 79 are cruciform in crosssection, the amount of control material in the two arms transverse of the core centerline 140 does not extend to the tips thereof. This reduces the variation of flux in the test section that by experiment has been shown to occur between full control rod insertion and withdrawal. To further decrease the flux variation at an intermediate position between full control and rod insertion and full control rod withdrawal, a "gray" section (not shown) is located between the control rod and the follower rod. This "gray" section would be comprised of a material with a neutron absorbing factor somewhere between that of the control rod and the follower rod, e.g., cobalt or nickel, and would provide a transition zone between flux patterns formed by the control rod and the follower rod. At one end of the core two regulating control rods 78 of a T cross-section are movably positioned between the fuel element assemblies 87 and reflector elements 88. These may be either manually or automatically controlled and are for short term control.

The test space is arranged in such a manner as to fall within the flux gradient zone where changes in control rod position result in relatively no change in average flux in the test element during the irradiation cycle. In typical reactors it is assumed that the greatest change would occur when the rods which have been entirely inserted are withdrawn from the core. FIG. 6 shows a typical plot of the neutron flux across the reactor of the present invention through test loops 42. This change in control rod position produced a large change in the position of highest flux in the reactor fuel but makes only a minor change in the average flux in the test region. When the control rods are in place in the core, the point of highest flux is on the outside of the test samples, i.e., farthest away from the control rod. When the control rods are out and replaced by follower rods, the point of highest flux is in the center of the fuel elements on the inside of the test samples (nearest the follower rod). It may be seen that the total flux occurring in the test loop is substantially constant regardless of the position of the control rods and the radiation incident upon the test loop is nearly constant throughout the life of the fuel.

Figure 10:
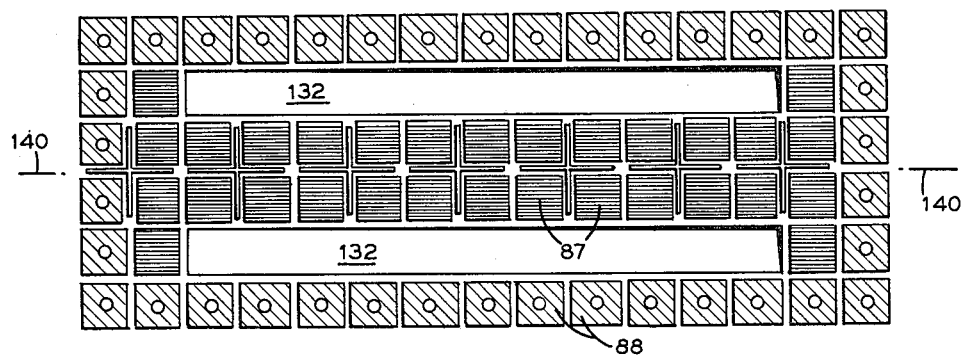
FIG. 10 is a plan view of a further alternate core arrangement.

The basic core as shown in FIG. 10 is slab shaped, two fuel elements wide and of any desired length and is designed for maximum neutron leakage into an adjacent test space. The basic slab design, from which the arrangements in FIGS. 3, 7, 8 and 9 are derived, has the major concentration of fuel elements 87, disposed along the core centerline 140. The square test loops 42, which have four times the cross-sectional area of a fuel element 87, are spaced next to the slab and have a single row of fuel elements on either side normal to the core centerline 140. Interior moderator elements 90 are spaced at the ends of the slab, between the fuel elements 87 at the sides of the test loops 42. These moderator elements replace fuel elements in the slab and reduce the fuel loading required in the core. The entire core is then surrounded by reflector elements 88, aluminum blocks 81, and an aluminum shroud 83.

The minimum core geometry to achieve criticality, as shown in FIG. 7, consists of 12 fuel elements 87, 4 beryllium interior moderator elements 90, 24 reflector elements 88, and 2 test loops 42. The size, however, is easily adjustable by lengthening the slab shaped reactor core. The core is designed to provide a flexible arrangement of fuel elements, reflector elements, test loops, and capsule positions. Thus the reactor may be arranged with as few as 1 or as many as 8 independent test loops (FIG. 9) of this size.

It is possible to increase to more than 8 the number of test loops by utilizing smaller test loops 130 that only occupy the space of a single fuel element as shown in FIGS. 3 and 8. It should also be noted that FIGURE 10 illustrates a reactor arrangement wherein only two elongated test areas 132 are utilized without any interior moderator element 90. Each of these alternates increases the flexibility and utility of the reactor core and permits the testing of many different types of fuel arrangements.

This core is characterized by the fact that with all of the arrangements illustrated there is a very flat neutron flux profile through the test sections. Beryllium, provided around the core in the reflecting elements 88, serves to even out the flux through the test sections. The use of beryllium also reduces the number of fuel elements required per test loop (4½ per loop in the 8 loop core of FIG. 9). The test loops are still essentially surrounded by fuel since the beryllium acts to reflect neutrons into the test regions. The thickness of the fuel between the test loops is such that there is essentially little interaction between test locations. Thus any fuel sample may be tested in a test loop 42 without interfering with a test proceeding in an adjacent loop.

The slab-type core provides high neutron leakage into the test regions and, therefore, the ratio of flux in the test spaces to that in the core is high. This type of arrangement has been found by us to be the best for obtaining these results and has never been achieved prior to this with such flexibility and adaptability.

Further, it may be seen that the core is characterized in all of the arrangements by the fact that the centerline of the core is through the centerline of the control rods with the fuel elements, test spaces, and reflector elements arranged substantially symmetrically with respect to the centerline. The fuel elements are arranged along the centerline of the core with test spaces disposed adjacent the fuel elements at spaced locations from the centerline, i.e., with the fuel elements between the test elements and the centerline. The test elements parallel to the centerline are then separated by other fuel elements positioned between adjacent test elements. As set forth above, interior moderator elements are also positioned within the core to reduce the fuel loading in the reactor. The entire array of fuel elements, test elements, and interior reflector elements are surrounded by the exterior reflector elements, the aluminum blocks, and the core shroud.

It may be noted that the proportionate space occupied by the fuel elements, the reflector elements, and the test spaces is substantially constant for the various core arrangements illustrated in FIGS. 3, 7, 8, 9 and 10. It should be further noted that the amount of fuel element space approximates that utilized for testing spaces so that nearly as much space is utilized for testing space in the core as is necessary for fuel elements, thus giving increased testing economy.

With a reactor design such as we have herein described we have been able to achieve a high degree of flexibility without a corresponding increase in complexity and expense. By using the basic slab shaped core as described above we can achieve the most efficient neutron flux distribution in the test area, i.e., the optimum flux with the least number of fuel elements per test area. This has been further enhanced by our use of an efficient neutron reflector, e.g., beryllium, which gives the effect of surrounding the test area with fuel elements. Further, the use of such reflector elements helps eliminate the "peaks and valleys" in the flux distribution in the test spaces.

While in accordance with the provisions of the statutes we have illustrated and described herein the best forms and modes of operation now known to us, those skilled in the art will understand that changes may be made in the forms of the apparatus disclosed without departing from the spirit of the invention covered by our claims, and that certain features of our invention may sometimes be used to advantage without a corresponding use of other features.

What is claimed is:

1. In a nuclear fuel test reactor, a core comprising a plurality of spaced elongated longitudinally parallel control rods disposed in a common plane, a number of elongated longitudinally parallel heterogeneous fuel elements disposed in said core in a plane parallel and contiguous to said plane of said control rods, a plurality of longitudinally parallel reflector elements disposed about and in parallel spaced relationship with said fuel elements to form a fuel test space therebetween adjacent said fuel elements at a position opposite from said control rods, means including a test element disposed within said test space, a second number of fuel elements disposed between said reflector elements and said plane of said first number of fuel elements in a plane normal to said control rod plane to subdivide said test space into a plurality of adjacent test spaces parallel to said control rod plane, and a number of interior moderator elements positioned one at each intersection of said plane of said first named fuel elements with said normal plane of said second named fuel elements.

2. In a nuclear fuel test reactor, a core comprising a plurality of spaced elongated longitudinally parallel control rods disposed in a common plane, a number of elongated longitudinally parallel heterogeneous fuel elements disposed in said core in a plane parallel and contiguous to said plane of said control rods, a plurality of longitudinally parallel reflector elements disposed about and in parallel spaced relationship with said fuel elements to form a fuel test space therebetween adjacent said fuel elements at a position opposite from said control rods, means including a test element disposed within said test space, a second number of fuel elements disposed between said reflector elements and said plane of said first number of fuel elements in a plane normal to said control rod plane to subdivide said test space into a plurality of adjacent test spaces parallel to said control rod plane, and a number of interior moderator elements positioned one at each intersection of said plane of said first named fuel elements with said normal plane of said second named fuel elements where said second named fuel elements are contiguous to said plane of said first named fuel elements.

3. In a nuclear fuel test reactor, a core comprising a plurality of spaced elongated longitudinally parallel control rods disposed in a common plane, a number of elongated longitudinally parallel heterogeneous fuel elements disposed in said core in a plane parallel and contiguous to said plane of said control rods, a number of fuel test elements disposed in said core contiguous to said fuel elements opposite said control rods, a second number of elongated heterogeneous fuel elements disposed in said core between and contiguous to any two adjacent test elements where said adjacent test elements lie in a plane parallel to said plane of said control rods, a plurality of reflector elements contiguous to said core at its periphery, said second fuel elements having their longitudinal axes lying in a plane normal to said control rod plane, and a number of interior moderator elements positioned one at each intersection of said plane of said first named fuel elements with said normal plane of said second named fuel elements where said second named fuel elements are contiguous to said plane of said first named fuel elements, said test elements having cross-sections substantially equal to whole multiples of that of said fuel elements.

4. In a nuclear fuel test reactor, a core comprising a plurality of spaced elongated longitudinally parallel control rods disposed in a common plane, a number of elongated longitudinally parallel heterogeneous fuel elements disposed in said core in a plane contiguous to said plane of said control rods, a number of fuel test elements disposed in said core contiguous to said fuel elements opposite said control rods, a second number of elongated heterogeneous fuel elements disposed in said core between and contiguous to any two adjacent test elements where said adjacent test elements lie in a plane parallel to said plane of said control rods, a plurality of reflector elements contiguous to said core at its periphery, said second fuel elements having their longitudinal axes lying in a plane normal to said control rod plane, and a number of interior moderator elements positioned one at each intersection of said plane of said first named fuel elements with said normal plane of said second named fuel elements where said second named fuel elements are contiguous to said plane of said first named fuel elements, said test elements having cross-sections substantially equal to whole multiples of that of said fuel elements, said interior moderator elements adapted to provide supplementary testing space therewithin, said core being symmetrical about said plane of said control rods.

5. A nuclear fuel test reactor comprising a plurality of elements arranged within said reactor to form a core adapted to undergo a self-sustaining fission type chain reaction, said elements comprising a plurality of control rods disposed in a common plane, a plurality of elongated longitudinally parallel heterogeneous fuel elements, a number of said fuel elements disposed in a plane contiguous to said control rod plane, a plurality of longitudinally parallel reflector elements disposed in parallel spaced relationship with said fuel elements and cooperating with said fuel elements to form a fuel testing space therebetween, said fuel elements disposed intermediate said fuel testing space and said control rod plane to provide a substantially constant neutron flux to said fuel testing space, means including a test element disposed within said testing space, and at least one of said fuel elements disposed between said plane of said number of fuel elements and said reflector elements to subdivide said fuel testing space.

6. A nuclear fuel test reactor comprising a plurality of elements arranged within said reactor to form a core adapted to undergo a self-sustaining fission type chain reaction, means to align and support said elements, said elements comprising a plurality of control rods disposed in a common plane, a plurality of elongated longitudinally parallel heterogeneous fuel elements, a number of said fuel elements disposed in a plane contiguous to said control rod plane, a plurality of longitudinally parallel reflector elements disposed in parallel spaced relationship with said fuel elements and cooperating with said fuel elements to form a fuel testing space therebetween, said fuel elements disposed intermediate said fuel testing space and said control rod plane to provide a substantially constant neutron flux to said testing space, means including a test element disposed within said testing space, and at least one of said fuel elements disposed between said reflector elements and said plane of said number of fuel elements in a plane normal to said first named plane to subdivide said fuel test space into a plurality of test spaces.

7. In a nuclear fuel test reactor having a cylindrical pressure vessel, a plurality of elements arranged within said pressure vessel and cooperating to form a core adapted to undergo a self-sustaining fission type chain reaction, a horizontal grid plate disposed within said pressure vessel to support and align said elements, said elements comprising a plurality of spaced elongated longitudinally parallel control rods disposed in a vertical plane intersecting said grid plate and forming a longitudinal center line thereof, a number of vertically elongated longitudinally parallel heterogeneous fuel elements disposed contiguous to said control rod plane, a plurality of longitudinally parallel reflector elements disposed about and in parallel spaced relationship with said fuel elements and cooperating with said fuel elements to form a fuel testing space therebetween, means including a test element disposed within said testing space, said fuel elements being arranged intermediate said testing space and said control rod plane to provide a substantially constant neutron flux to said testing space, and means for passing a combined moderator coolant fluid through said elements of said core.

References Cited in the file of this patent
UNITED STATES PATENTS
2,921,007     Spindrad _____ Jan. 12, 1960

OTHER REFERENCES

AECD-3682.
Atomic Energy Commission Document: ANL-4551, Experimental Facility Provided in the Material Testing Reactor, Winkleblack, December 29, 1949, declass. December 8, 1955, pages 6-10.

UNITED STATES PATENT OFFICE
CERTIFICATE OF CORRECTION

Patent No. 3,140,980

July 14, 1964

William M. Breazeale et al.

It is hereby certified that error appears in the above numbered patent requiring correction and that the said Letters Patent should read as corrected below.

Column 2, line 2, for "verticaly" read -- vertically --; column 6, like 30, for "crosssection" read -- cross-section --; line 55, after "the" insert -- control --; same column 6, line 59, for "produced" read -- produces --; column 7, line 31, for "element" read -- elements --.

Signed and sealed this 29th day of June 1965.

(SEAL)
Attest:

ERNEST W. SWIDER
Attesting Officer

EDWARD J. BRENNER
Commissioner of Patents